UNITED STATES PATENT OFFICE.

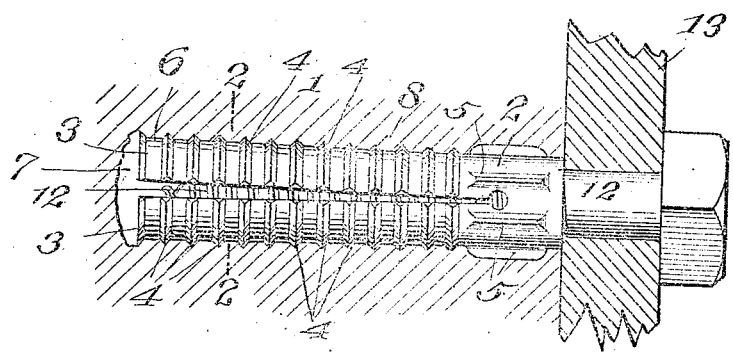
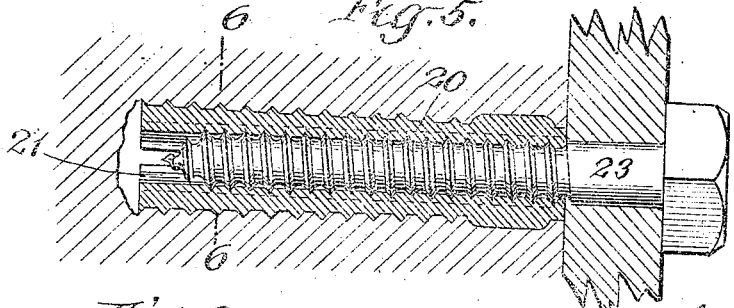
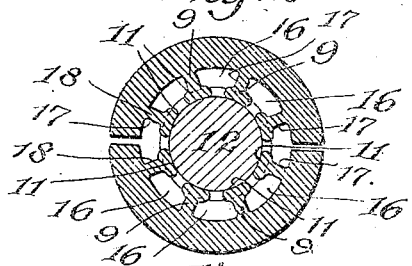
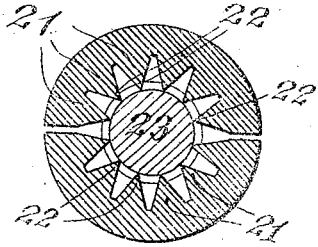
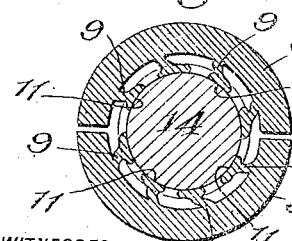
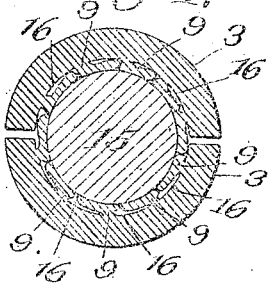
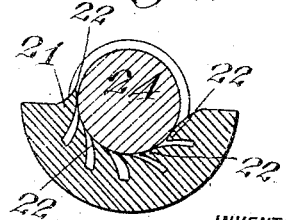

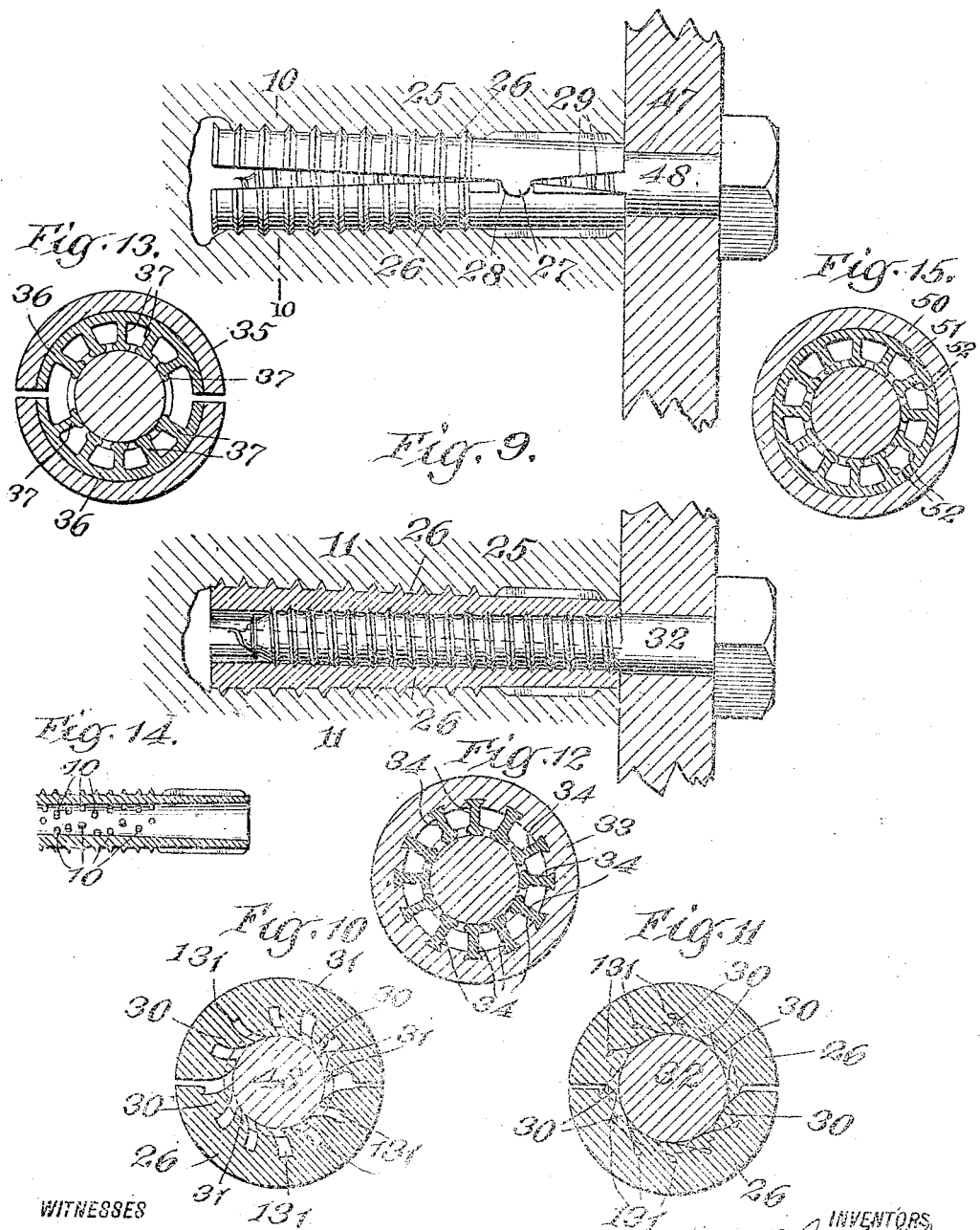

HENRY B. NEWHALL, JR., OF PLAINFIELD, AND HENRY W. PLEISTER, OF WESTFIELD, NEW JERSEY; SAID PLEISTER ASSIGNOR TO HENRY B. NEWHALL, SR.

BOLT-ANCHOR.

1,057,975. Specification of Letters Patent. Patented Apr. 1, 1913.

Application filed May 29, 1911. Serial No. 630,116.

*To all whom it may concern:*

Be it known that we, HENRY B. NEWHALL, Jr., of Plainfield, in the county of Union and State of New Jersey, and HENRY W. PLEISTER, of Westfield, in the county of Union and State of New Jersey, citizens of the United States, have jointly invented certain new and useful Improvements in Bolt-Anchors, of which the following is a specification, taken in connection with the accompanying drawings, which form a part of the same.

This invention relates to bolt anchors, and more particularly to means for permitting a bolt anchor of a given cross section to be used with a wide range of screws or bolts of different cross sections. By our invention it is not necessary for the dealer to carry a large range of different sized bolt anchors to coöperate with a large range of different sized screws or bolts, for one of our bolt anchors will coöperate, within a wide range, with bolts or screws of various cross sections. The smallest bolt or screw, which is adapted to coöperate with any of our particular sized bolt anchors, cuts its own thread on the interior projections or ribs without substantially bending or distorting them. The largest screw or bolt which can be used with any particular sized bolt anchors will form its own seat in the bolt anchor by bending down and re-positioning the interior ribs or projections to form a new interior bore within the bolt anchor within which it will cut its own coöperating screw threads. The different sized bolts or screws, between the minimum and maximum cross section with which any particular sized bolt anchor is adapted to be used, will readily coöperate with the interior projections or ribs of the bolt anchor and bend them, more or less, to fit the particular cross section of the screw or bolt.

Our invention further comprises certain details of construction which will be more fully described hereinafter in the specification and pointed out in the claims.

In the accompanying drawings showing illustrative embodiments of our invention and in which the same reference numerals refer to similar parts in the several figures,—Figure 1 is a side elevation of one form of bolt anchor equipped with our invention, the support and the article supported being shown in section, with the coöperating bolt in side elevation; Fig. 2 is a vertical section on the line 2—2 of Fig. 1; Fig. 3 is a cross section of the bolt anchor shown in Fig. 1 when used with a larger bolt or screw than that illustrated in Fig. 1; the bolt being shown in section; Fig. 4 is a cross section through the bolt anchor shown in Fig. 1, illustrating the position of the parts when a still larger bolt is used, the bolt or screw being shown in section; Fig. 5 is a vertical section through a bolt anchor equipped with a different form of our invention, the bolt being shown in side elevation; Fig. 6 is a cross section on the line 6—6 of Fig. 5; Fig. 7 is a cross section of the bolt anchor shown in Fig. 5 but used with a larger bolt than that illustrated in that figure; Fig. 8 is a side elevation of a two-part bolt anchor equipped with our invention, the support and article supported being shown in section; Fig. 9 is a vertical section of the bolt anchor shown in Fig. 8; Fig. 10 is a transverse vertical section substantially on the line 10—10 of Fig. 8; Fig. 11 is a cross section of the bolt anchor shown in Fig. 8 when used with a larger bolt than that shown in that figure, the bolt being illustrated in section; Fig. 12 is a vertical section showing a modification; Fig. 13 is a vertical section of another modification; Fig. 14 is a detail view of a further modification; and Fig. 15 is a detail view of a further modification.

In the illustrative embodiments of our invention shown in the drawings, 1 is a bolt anchor provided with a ring 2 and with a plurality of tines 3, 3. On its exterior surface we may, though not necessarily, arrange transverse ribs 4, 4, and longitudinally extending ribs 5, 5 to bite into the wall 6 of the aperture 7 in the support 8 which may be of brick, masonry, stone, wood, terra cotta, or any material.

We provide the interior bore of the bolt anchor 1 with one or more interior projections 9, 9. These projections are preferably arranged in the form of longitudinally extending ribs, though they may be simply pins 10, 10 as shown in Fig. 14. The ends 11 of the ribs 9 extend in toward the axis of the bolt anchor a sufficient distance to engage with the bolt 12 of minimum cross section to be used with that particular sized bolt anchor. When the bolt anchor 1, for example, has been located in the aperture 7, the article supported 13, will be firmly clamped to the support 8 by the male screw threads of the bolt 12 cutting their own female screw threads on the ends of the longitudinally extending ribs 9, 9, Fig. 2. When for any reason it is necessary or desirable to use with the same diameter bolt anchor a bolt or screw larger in cross section than the bolt 12, the same bolt anchor will readily coöperate with the larger bolt 14, Fig. 3, the longitudinally extending ribs 9, 9 being bent as shown for example in Fig. 3. The larger bolt forms a larger axial bore in the bolt anchor and at the same time cuts its own threads in the re-positioned ribs. Should a bolt of, for example, the minimum size 12 or some intermediate size 14 be not accessible, or for any reason it is desirable to use a larger bolt or screw 15, the same bolt anchor 1 will, by means of our invention readily coöperate with the larger bolt or screw 15, Fig. 4. With such a bolt 15, which is assumed for purposes of illustration to be the maximum sized bolt or screw which will coöperate with the given sized bolt anchor 1, the longitudinally extending ribs 9, 9 will be still further displaced and re-positioned, their ends 11 being bent in the direction of rotation of the screw and pressed into the openings 16, 16, Fig. 2, between the different longitudinal ribs and will substantially close these openings, thereby forming an entirely new and larger axial bore in the bolt anchor 1 within which the bolt or screw 15 cuts its own threads. The bolt or screw bends the ribs and cuts its own threads substantially simultaneously. It is, of course, to be understood, however, that should it ever be desirable, the longitudinal ribs 9, 9 may be bent by hand or tools before the insertion of the bolt or screw, but as this would be an additional step, it would not ordinarily be done.

In illustrating the bolt 12 of minimum cross section and a bolt 15 of maximum cross section, it is to be clearly understood that screws or bolts of different cross sections within this wide range may be used with the same diameter bolt anchor.

We, preferably, though not necessarily, weaken the longitudinally extending ribs 9, 9 so that they will bend more readily. This may be done in various ways. For example, we may cut away the ribs at 17, 17 forming a neck 18 which will permit the ribs to be readily bent upon the insertion of a screw or bolt of any cross section greater than that of the minimum, as for example the bolt 12, which will cut its own screw threads in the ends 11 without appreciably bending the longitudinal extending ribs 9.

In some cases we may provide a bolt anchor 20, Fig. 5, with inwardly extending longitudinal ribs 21, 21, Fig. 6, each rib having a weakened end 22 in the form of a tooth within which the bolt or screw 23, of minimum cross section, is adapted to cut its own threads without bending the ribs. Upon inserting a larger bolt or screw 24, Fig. 7, these ribs 21 will be bent in the direction of rotation of the screw 24 and form a larger axial bore in the bolt anchor 20. It is obvious that upon inserting a larger bolt or screw than 24 the longitudinally extending ribs 21 will be still further bent until they substantially touch each other, the openings between the different ribs being then substantially closed.

While we preferably use a one piece bolt anchor formed of some ductile material such as lead or an alloy, we may, however, form the bolt anchor of two or more parts as shown in Figs. 8 and 9. In this form of our invention the bolt anchor 25 is formed of two sections 26, 26 secured together by means of the clamping ears 27 on one section 26 which fit into the complementary openings 28 on the other section 26 and are bent inward to hold the two sections 26, 26 together. We preferably set in the clamping ears 27 from the end 47 of the bolt anchor so that the insertion of the bolt or screw 48 will cause the two members 26, 26 to pivot on the ears 27. To prevent the screw 48 from forcing the two members 26, 26 apart to such an extent as to withdraw the locking ears 27 from their coöperating recesses 28, we cut away the end of the members 26, 26 so that the two inclined surfaces 29, 29 will not contact with each other and hence there can be no pivoting of the two members 26, 26 except on the clamping ears 27. On the interior of the different members 26, 26 we provide a plurality of longitudinally extending ribs 30, 30 having weakened end portions 31 which are initially bent or curved in the direction of rotation of the bolt 48. This screw or bolt 48, which it will be assumed will be of the minimum cross section for the particular sized bolt anchor, will cut its own threads in the longitudinally extending ribs 30 without substantially bending them. A larger bolt or screw 32, Fig. 9, inserted in the same bolt anchor 25 will cause the different longitudinally extending ribs 30, 30 to contact with each other and substantially close the openings 131 between them, Fig. 11. It will, therefore, be seen that in a two part bolt anchor, as well as in a one-part bolt anchor, various sized bolts or screws, within a wide range, can be used with a bolt anchor of a given cross section.

While we preferably form the bolt anchor out of ductile material we may for example form the body of the bolt anchor 33, Fig. 12, out of cast iron or some other rigid material and mount within it projections or ribs 34, of some ductile material which will yield to coöperate with different sized bolts or screws and within which complementary screw threads can be formed by the bolt or screw.

We may also form our bolt anchor of rigid material such as cast iron, or similar material 35, Fig. 13, and provide it with a lining 36 of some ductile material, which lining will carry the longitudinally inwardly extending ribs or projections 37 preferably formed integral with the lining. In Fig. 13 we have shown the lining in a two part bolt anchor, though, of course, it is to be understood that it may be used with a one part bolt anchor 50, if so desired, Fig. 15, having a lining 51 and projections 52.

While in all forms of our invention we preferably use longitudinal extending ribs, so that as one rib is forced into engagement with its adjacent rib there will be substantially a continuous wall for the screw or bolt to cut its own female threads. We may, however, use staggered, or any form of projections, like 10, 10, Fig. 14, for all such forms would come within the terms of our invention. With longitudinally extending ribs, however, a larger bolt or screw, to support a heavier object, will bend the ribs so as to form a larger interior bore having substantially continuous walls in which the thread on the bolt or screw will form a substantially continuous female thread and consequently form a stronger hold between the anchor and bolt or screw than if merely staggered or other projections as 10 were employed. It will, therefore, be seen that by our invention it will not be necessary to manufacture or keep in stock a given sized bolt anchor for substantially each size of bolt or screw, but that on the contrary a given sized bolt anchor will receive and coöperate with bolts or screws of various cross sections within a relatively wide range.

In those cases where the bolt anchor is used with a larger bolt or screw than the one of minimum cross section for that sized bolt anchor, it is, of course, to be understood that if the cross section of the opening in the support, is greater than the support to receive the bolt anchor, the bolt anchor will be expanded without bending the projections or longitudinally extending ribs, the larger screw or bolt in that case cutting its own coöperating female thread in the projections or ribs without bending them.

Having thus described this invention in connection with several illustrative embodiments thereof to the details of which we do not desire to be limited, what is claimed as new and what it is desired to secure by Letters Patent is set forth in the appended claims:

1. The combination of a bolt anchor of a given diameter comprising a body member and bendable portions of ductile material carried on the interior of the bolt anchor and adapted to coöperate with expanding means of different diameters.

2. A bolt anchor comprising a body member and interior ductile projections adapted to be bent independently of the body member to coöperate with different sized bolts and screws.

3. A bolt anchor comprising a body member and interior weakened ductile projections adapted to be bent circumferentially and independently of the body member, to coöperate with different sized bolts and screws.

4. A bolt anchor including a body member provided with a plurality of interior spaced ductile projections arranged tangentially to the interior bore of the body member and adapted to have relative and independent movement with relation to the body member to coöperate with a relatively large screw or bolt.

5. A one piece bolt anchor including one or more tines, one or more interior ductile projections carried by the tines, said ductile projections being adapted to have independent movement with relation to the tines on which they are mounted to coöperate with a relatively large bolt or screw.

HENRY B. NEWHALL, Jr.
    HENRY W. PLEISTER.

Witnesses:
 A. M. WILLIAMS,
 C. M. LYONS.